United States Patent
Choi et al.

(10) Patent No.: US 9,246,162 B2
(45) Date of Patent: Jan. 26, 2016

(54) CATHODE ACTIVE MATERIAL AND LITHIUM SECONDARY BATTERY CONTAINING THE SAME

(71) Applicant: LG CHEM, LTD., Seoul (KR)

(72) Inventors: Sang Kyu Choi, Daejeon (KR); SeungByung Lee, Gwangju (KR)

(73) Assignee: LG CHEM, LTD., Seoul (KR)

(*) Notice: Subject to any disclaimer, the term of this patent is extended or adjusted under 35 U.S.C. 154(b) by 476 days.

(21) Appl. No.: 13/964,700

(22) Filed: Aug. 12, 2013

(65) Prior Publication Data

US 2013/0330612 A1 Dec. 12, 2013

Related U.S. Application Data

(63) Continuation of application No. PCT/KR2012/002919, filed on Apr. 17, 2012.

(30) Foreign Application Priority Data

Apr. 18, 2011 (KR) .................. 10-2011-0035489

(51) Int. Cl.
| | |
|---|---|
| H01M 4/02 | (2006.01) |
| H01M 4/131 | (2010.01) |
| C01G 45/12 | (2006.01) |
| C01G 51/00 | (2006.01) |
| C01G 53/00 | (2006.01) |
| H01M 4/36 | (2006.01) |
| H01M 4/505 | (2010.01) |
| H01M 4/525 | (2010.01) |
| H01M 10/052 | (2010.01) |
| B60L 11/18 | (2006.01) |

(52) U.S. Cl.
CPC ............ *H01M 4/131* (2013.01); *B60L 11/1864* (2013.01); *B60L 11/1879* (2013.01); *C01G 45/1228* (2013.01); *C01G 45/1242* (2013.01); *C01G 51/50* (2013.01); *C01G 53/50* (2013.01); *H01M 4/364* (2013.01); *H01M 4/505* (2013.01); *H01M 4/525* (2013.01); *H01M 10/052* (2013.01); *C01P 2002/32* (2013.01);

(Continued)

(58) Field of Classification Search
CPC ..... H01M 4/505; H01M 4/525; H01M 4/131; H01M 10/052
USPC ........................................................ 429/211
See application file for complete search history.

(56) References Cited

U.S. PATENT DOCUMENTS

| | | | |
|---|---|---|---|
| 2002/0061443 A1 | 5/2002 | Nakanishi et al. | |
| 2007/0048597 A1 | 3/2007 | Ryu et al. | |
| 2009/0181296 A1* | 7/2009 | Lampe-Onnerud et al. | .. 429/160 |

FOREIGN PATENT DOCUMENTS

| | | |
|---|---|---|
| CN | 1345101 A | 4/2002 |
| CN | 1902778 A | 1/2007 |

(Continued)

OTHER PUBLICATIONS

International Search Report issued in PCT/KR2012/002919, mailed on Nov. 30, 2012.

(Continued)

*Primary Examiner* — Jonathan Jelsma

(74) *Attorney, Agent, or Firm* — Birch, Stewart, Kolasch & Birch, LLP

(57) ABSTRACT

Disclosed herein is a cathode active material for secondary batteries and a secondary battery including the same, the cathode active material including lithium manganese oxide (A) having a spinel crystal structure and at least two types of lithium nickel-manganese-cobalt composite oxides (B) containing Ni, Mn, and Co as transition metals, wherein the lithium nickel-manganese-cobalt composite oxides (B) are different from each other in terms of at least one selected from the group consisting of elemental composition, particle diameter, and density.

9 Claims, 3 Drawing Sheets

(52) U.S. Cl.
CPC ......... *C01P2004/80* (2013.01); *C01P 2006/40* (2013.01); *H01M 2220/20* (2013.01); *Y02E 60/122* (2013.01); *Y02T 10/7005* (2013.01); *Y02T 10/7011* (2013.01); *Y02T 10/7061* (2013.01)

(56) References Cited

FOREIGN PATENT DOCUMENTS

| | | |
|---|---|---|
| CN | 101223658 A | 7/2008 |
| JP | 2002-042816 | 2/2002 |
| JP | 2002-80448 A | 3/2002 |
| JP | 2002-110253 A | 4/2002 |
| JP | 2004-134245 A | 4/2004 |
| JP | 2008-098142 | 4/2008 |
| JP | 2008-235157 A | 10/2008 |
| KR | 10-0458584 B1 | 11/2004 |
| KR | 10-0570417 B1 | 4/2006 |
| KR | 10-2007-0021041 A | 2/2007 |
| WO | WO 2005/064715 A1 | 7/2005 |

OTHER PUBLICATIONS

Chinese Office Action issued in Chinese Patent Application No. 201280015869.2 on Sep. 8, 2015.

* cited by examiner

CATHODE ACTIVE MATERIAL AND LITHIUM SECONDARY BATTERY CONTAINING THE SAME

CROSS REFERENCE TO RELATED APPLICATIONS

This application is a Bypass Continuation of PCT International Application No. PCT/KR2012/002919 filed on Apr. 17, 2012, which claims priority under 35 U.S.C §119(a) to Patent Application No. 10-2011-0035489 filed in the Republic of Korea on Apr. 18, 2011, all of which are hereby expressly incorporated by reference into the present application.

TECHNICAL FIELD

The present invention relates to a cathode active material for secondary batteries and a lithium secondary battery including the same, and, more particularly, to a cathode active material for secondary batteries and a lithium secondary battery including the same, wherein the cathode active material includes lithium manganese oxide (A) having a spinel crystal structure and at least two types of lithium nickel-manganese-cobalt composite oxides (B) that are different from each other in terms of at least one selected from the group consisting of elemental composition, particle diameter, and density, thereby achieving superior battery life and power characteristics.

BACKGROUND ART

Technological development and increased demand for mobile devices have led to rapid increase in the demand for secondary batteries as energy sources. Among such secondary batteries, lithium secondary batteries having high energy density, high operating voltage, long cycle span and low self-discharge rate are commercially available and widely used.

In addition, increased interest in environmental issues has recently brought about a great deal of research associated with electric vehicles (EV) and hybrid electric vehicles (HEV) as alternatives to vehicles using fossil fuels such as gasoline vehicles and diesel vehicles which are main causes of air pollution. Such electric vehicles generally use nickel-metal hydride (Ni-MH) secondary batteries as power sources. However, a great deal of study associated with use of lithium secondary batteries having high energy density, high discharge voltage and stable output is currently underway and some are commercially available.

In particular, lithium secondary batteries used for electric vehicles should have high energy density, output high power in a short time and be operable under severe conditions for 10 years or longer, thus requiring considerably superior stability and long lifespan, as compared to conventional small lithium secondary batteries. In addition, lithium secondary batteries used for electric vehicles (EVs), hybrid electric vehicles (HEVs) and the like should have high rate and power characteristics according to operational conditions of the vehicles and exhibit excellent operability even at low temperatures.

Conventional lithium secondary batteries used for small-size batteries generally use lithium cobalt composite oxide having a layered structure for a cathode and a graphite-based material for an anode. However, lithium cobalt composite oxide is disadvantageous in that cobalt used as a main element is very expensive and lithium cobalt composite oxide is unsuitable for use in an electric vehicle in terms of stability. Accordingly, lithium manganese composite oxide having a spinel crystal structure composed of manganese, which is low-cost and exhibits superior stability, may be suitable for the cathode of lithium ion batteries for electric vehicles.

However, when lithium manganese composite oxide is stored at high temperature, manganese is eluted into an electrolyte, deteriorating battery properties. Thus, there is a need for measures to prevent this phenomenon. Further, lithium manganese composite oxide disadvantageously has a small capacity per unit battery weight, as compared to conventional lithium cobalt composite oxides or lithium nickel composite oxides, thus limiting an increase in capacity per unit battery weight. Battery design to overcome this limitation should be carried out to put secondary batteries employing the material into practical use as power sources of electric vehicles.

To solve these disadvantages, studies have been conducted into fabrication of an electrode using a mixed cathode active material. For example, Japanese Patent Application Publication Nos. 2002-110253 and 2004-134245 describe technologies in which a mixture of lithium manganese composite oxide and lithium nickel cobalt manganese composite oxide is used to increase regenerative power or the like. However, these technologies still have disadvantages of poor cycle life of lithium manganese oxide and limitation of improvement in stability.

Further, Korean Patent No. 0458584 describes a technology associated with a cathode active material composed of a nickel-based large-diameter active material compound with an average diameter of 7 to 25 μm and a small-diameter active material compound with an average diameter of 2 to 6 μm (for example, $LI_xMn_2O_{4-z}X_z$, where X represents F, S or P and $0.90 \leq x \leq 1.1$ and $0 \leq z \leq 0.5$) to increase the bulk density of an electrode plate and thereby improve battery capacity.

In addition, to improve battery capacity, life and high-rate discharge properties, Korean Patent No. 0570417 uses lithium dimanganese tetroxide having a spinel crystal structure as a cathode active material, Japanese Patent Application Publication No. 2002-0080448 uses a cathode active material containing lithium manganese composite oxide, and Japanese Patent Application Publication No. 2004-134245 uses a cathode active material containing lithium transition metal composite oxide and lithium manganese composite oxide having a spinel crystal structure to fabricate a secondary battery.

However, secondary batteries with desired stability and life characteristics have yet to be developed.

DISCLOSURE

Technical Problem

Therefore, the present invention has been made to solve the above and other technical problems that have yet to be resolved.

As a result of intensive studies and various experiments, the present inventors have developed a cathode active material for secondary batteries, which includes lithium manganese oxide having a spinel crystal structure and at least two types of lithium nickel-manganese-cobalt composite oxides that are different from each other in terms of elemental composition, properties, or the like as described below, and unexpectedly discovered that, when a secondary battery is fabricated using the cathode active material, battery stability, life and low temperature characteristics are significantly improved while power characteristics are superior. The present invention was completed based on this discovery.

Technical Solution

In accordance with the present invention, the above and other objects can be accomplished by the provision of a cathode active material for secondary batteries, the cathode active material including lithium manganese oxide (A) having a spinel crystal structure and at least two types of lithium nickel-manganese-cobalt composite oxides (B) containing Ni, Mn, and Co as transition metals, wherein the lithium nickel-manganese-cobalt composite oxides (B) are different from each other in terms of at least one selected from the group consisting of elemental composition, particle diameter, and density.

According to present invention, a cathode active material is formed by mixing lithium manganese oxide (A) having a spinel crystal structure and at least two types of lithium nickel-manganese-cobalt composite oxides (B), which are different from each other in elemental composition, particle diameter or the like as described above. Accordingly, it is possible to achieve a significant increase in battery life and power characteristics, especially low temperature power characteristics, while maintaining the same level of energy density, compared to when a cathode active material of a single composition is used.

Preferably, a mixture ratio of the lithium manganese oxide (A) to the lithium nickel-manganese-cobalt composite oxides (B) ranges from 30:70 to 90:10 by weight. An excessively low content of the lithium manganese oxide decreases battery stability and an excessively high content of the lithium manganese oxide is not preferred since desired energy density is not achieved.

The lithium manganese oxide (A) may be, for example, a material having an elemental composition represented by Formula (1):

$$Li_{1+x}Mn_{2-y}M_yO_4 \quad (1)$$

where $0 \leq x \leq 0.2$ and $0 \leq y \leq 1$, and M is at least one element selected from the group consisting of Al, Mg, Ni, Co, Fe, Cr, V, Ti, Cu, B, Ca, Zn, Zr, Nb, Mo, Sr, Sb, W and Bi.

Particularly, it is preferable that manganese be partially replaced by a different metal in the above elemental composition since this may further improve battery life characteristics.

Preferably, the lithium nickel-manganese-cobalt composite oxides (B), which are another component of the cathode active material of the present invention, are selected from compounds having an elemental composition represented by Formula (2):

$$Li_{1+z}Ni_aMn_bCo_{1-(a+b)}O_2 \quad (2)$$

where $0 \leq z \leq 0.1$, $0.2 \leq a \leq 0.7$, $0.2 \leq b \leq 0.7$ and $a+b \leq 1$.

The lithium nickel-manganese-cobalt composite oxides (B), each of which is lithium oxide containing Ni, Mn, and Co as shown in Formula (2), are combined with lithium manganese oxide to significantly improve stability and life characteristics of the cathode active material according to the present invention.

In the present invention, the lithium nickel-manganese-cobalt composite oxides (B) are a mixture of at least two types of oxides which are different from each other in terms of at least one selected from the group consisting of elemental composition, particle diameter, and density as described above, and various combinations thereof are possible by varying the above conditions.

In a first specific example, the lithium nickel-manganese-cobalt composite oxides (B) may include two types of oxides having the same elemental composition and different particle diameters. In a preferred example, the lithium nickel-manganese-cobalt composite oxides (B) may have an elemental composition of $Li_{1+z}Ni_{1/3}Mn_{1/3}Co_{1/3}O_2$ (where $0 \leq z \leq 0.1$) or $L_{1+z}Ni_aMn_bC_{1-(a+b)}O_2$ (where $0 \leq z1 \leq 0.1$, $0.4 \leq a \leq 0.7$, $0.2 \leq b \leq 0.4$ and $a+b \leq 1$), and different oxides (B1) and (B2) included in the lithium nickel-manganese-cobalt composite oxides (B) may have an average particle diameter in a range from 3 to 10 μm and an average particle diameter of the first oxide (B1) may be 10 to 70% of an average particle diameter of the second oxide (B2).

In a second specific example, the lithium nickel-manganese-cobalt composite oxides (B) may include two types of oxides having the same particle diameter and different elemental compositions. In a preferred example, the lithium nickel-manganese-cobalt composite oxides (B) may have different elemental compositions selected from $Li_{1+z}Ni_{1/3}Mn_{1/3}Co_{1/3}O_2$ (where $0 \leq z \leq 0.1$) and $Li_{1+z1}Ni_aMn_bCo_{1-(a+b)}O_2$ (where $0 \leq z1 \leq 0.1$, $0.4 \leq a \leq 0.7$, $0.2 \leq b \leq 0.4$ and $a+b \leq 1$). More preferably, among the lithium nickel-manganese-cobalt composite oxides (B), the first oxide (B1) may have an elemental composition of $Li_{1+z}Ni_{1/3}Mn_{1/3}Co_{1/3}O_2$ (where $0 \leq z \leq 0.1$) and the second oxide (B2) may have an elemental composition of $Li_{1+z}Ni_aMn_bCo_{1-(a+b)}O_2$ (where $0 \leq z1 \leq 0.1$, $0.4 \leq a \leq 0.7$, $0.2 \leq b \leq 0.4$ and $a+b \leq 1$). In this case, the lithium nickel-manganese-cobalt composite oxides (B) may have an average particle diameter of 3 to 10 μm with an error of ±10%.

Here, it should be noted that various combinations other than those of the above examples are possible and all of the combinations should be construed as being included in the scope of the invention.

The cathode active material according to the present invention prepared in the above manner may have, for example, an energy density of 150 to 220 Wh/kg.

A description of methods for preparing lithium metal composite oxide such as the lithium manganese oxide and the lithium nickel-manganese-cobalt composite oxides is omitted herein since the methods are well known in the art.

The present invention also provides a cathode mix including the cathode active material. The cathode mix according to the present invention may optionally include a conductive material, a binder, a filler, or the like in addition to the cathode active material.

The conductive material is commonly added in an amount of 0.01 to 30% by weight, based on the total weight of the mixture including the cathode active material. Any conductive material may be used without particular limitation so long as suitable conductivity is provided without causing chemical changes in the battery. Examples of the conductive material include graphite, carbon blacks such as acetylene black, Ketjen black, channel black, furnace black, lamp black and thermal black, conductive fibers such as carbon fibers and metallic fibers, metallic powders such as carbon fluoride, aluminum and nickel powders, conductive whiskers such as zinc oxide and potassium titanate whiskers, conductive metal oxides such as titanium oxide, and polyphenylene derivatives. Specific examples of commercially available conductive materials include various acetylene black products (available from Chevron Chemical company, Denka Singapore Private Limited and Gulf Oil company), Ketjen Black EC series (available from Armak company), Vulcan XC-72 (available from Cabot company) and Super P (available from Timcal company).

The binder is a component which assists in binding of an active material to a conductive material and a current collector. The binder is commonly added in an amount of 1 to 50% by weight, based on the total weight of the compound including the anode active material. Examples of the binder include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymers (EPDM), sulfonated EPDM, styrene butadiene rubbers, fluoro-rubbers, and various copolymers.

The filler is a component optionally used to inhibit expansion of the cathode. Any filler may be used without particular limitation so long as the filler is a fibrous material that does not cause chemical changes in the battery. Examples of the filler include olefin-based polymers such as polyethylene and polypropylene and fibrous materials such as glass fibers and carbon fibers.

The present invention also provides a cathode for secondary batteries, wherein the cathode mix is applied to a current collector. The cathode according to the present invention may be formed by adding the cathode mix including the cathode active material to a solvent such as NMP to prepare a slurry and applying the slurry to a cathode current collector, followed by drying and rolling.

The cathode current collector is generally manufactured to a thickness of 3 to 500 µm. Any cathode current collector may be used without particular limitation so long as suitable conductivity is provided without causing chemical changes in the battery. Examples of the cathode current collector include stainless steel, aluminum, nickel, titanium, sintered carbon, or aluminum or stainless steel surface-treated with carbon, nickel, titanium or silver. The cathode current collector may include fine irregularities on the surface thereof so as to enhance adhesion to the cathode active material. In addition, the cathode current collector may be provided in various forms such as a film, a sheet, a foil, a net, a porous structure, a foam and a nonwoven fabric.

The present invention also provides a lithium secondary battery including the cathode, an anode, a separator, and a lithium salt-containing non-aqueous electrolyte.

The anode is formed, for example, by applying an anode mix including an anode active material to an anode current collector, followed by drying. The anode mix may further include the components described above as needed.

The anode current collector is generally fabricated to a thickness of 3 to 500 µm. Any anode current collector may be used without particular limitation so long as high conductivity is provided without causing chemical changes in the battery. Examples of the anode current collector include copper, stainless steel, aluminum, nickel, titanium, sintered carbon, copper or stainless steel surface-treated with carbon, nickel, titanium or silver, and aluminum-cadmium alloys. Similar to the cathode current collector, the anode current collector may include fine irregularities on the surface thereof so as to enhance adhesion of anode active materials. In addition, the anode current collector may be provided in various forms such as a film, a sheet, a foil, a net, a porous structure, a foam and a nonwoven fabric.

The separator is interposed between the cathode and the anode. A thin insulating film having high ion permeability and mechanical strength is used as the separator. The separator typically has a pore diameter of 0.01 to 10 µm and a thickness of 5 to 300 µm. For example, a sheet or nonwoven fabric made of polyethylene or glass fibers or an olefin-based polymer such as polypropylene, which is chemically resistant and hydrophobic, is used as the separator. When a solid electrolyte such as a polymer electrolyte is used, the solid electrolyte may also serve as a separator.

The lithium salt-containing non-aqueous electrolyte includes a non-aqueous electrolyte and a lithium salt. A non-aqueous organic solvent, an organic solid electrolyte, an inorganic solid electrolyte or the like may be used as the non-aqueous electrolyte.

Examples of the non-aqueous organic solvent include aprotic organic solvents such as N-methyl-2-pyrollidinone, propylene carbonate, butylene carbonate, dimethyl carbonate, diethyl carbonate, ethylmethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include organic solid electrolytes such as polyethylene derivatives, polyethylene oxide derivatives, polypropylene oxide derivatives, phosphoric acid ester polymers, polyagitation lysine, polyester sulfide, polyvinyl alcohol, polyvinylidene fluoride, and polymers containing ionic dissociation groups.

Examples of the inorganic solid electrolyte include inorganic solid electrolytes such as nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3Co_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenylborate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrroles, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

The secondary battery according to the present invention is preferably used for battery cells serving as a power source for small-scale devices and is also preferably used as a unit cell of a middle or large-scale battery module including a plurality of battery cells that is used as a power source for middle or large-scale devices.

Preferred examples of the middle or large-scale devices include, but are not limited to, power tools that are powered by electrical motors, electric vehicles (EVs) including hybrid electric vehicles (HEVs) and plug-in hybrid electric vehicles (PHEVs), electric two-wheeled vehicles including electric bikes (E-bikes) and electric scooters (E-scooters), and electric golf carts.

BRIEF DESCRIPTION OF THE DRAWINGS

The above and other objects, features and other advantages of the present invention will be more clearly understood from the following detailed description taken in conjunction with the accompanying drawings, in which.

BEST MODE

Figure 1:
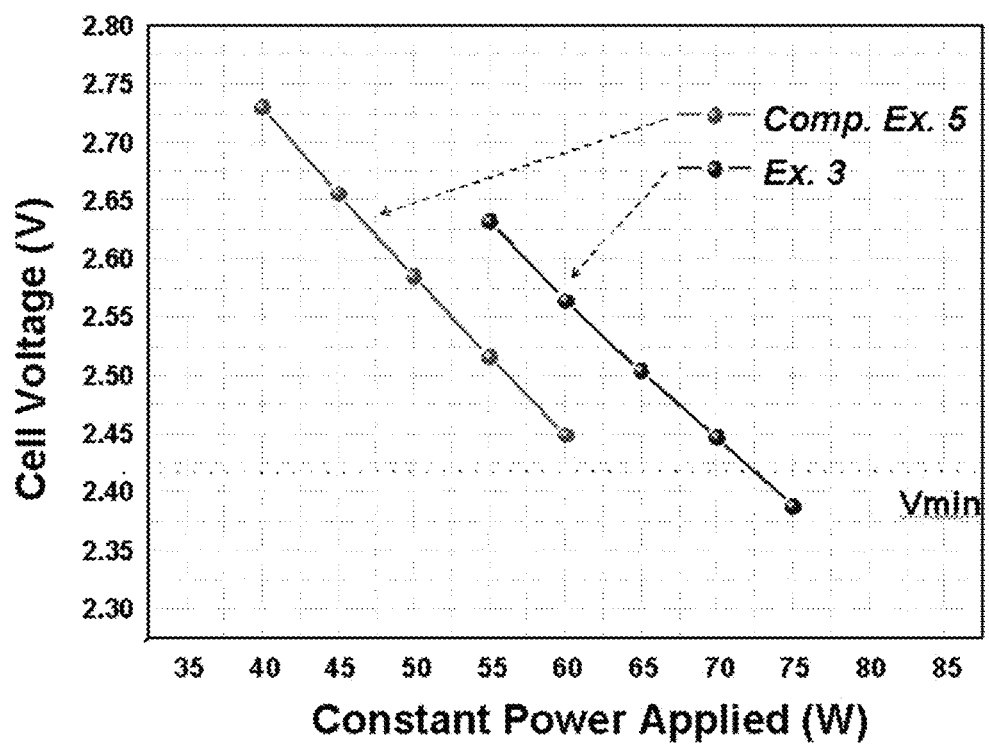
FIG. 1 is a graph showing measurement results of cold cranking power in Experimental Example 2.

The present invention will now be further described through examples. However, it should be noted that the following examples are given only to exemplify the present invention and the scope of the invention is not limited thereto.

Example 1

$LiMn_2O_4$ having an average particle diameter of 15 μm and a 50:50 mixture of two types of $LiNi_{1/3}Mn_{1/3}Co_{1/3}O_2$ having respective average particle diameters of 7.5 μm and 9 μm were mixed in a weight ratio of 50:50 to prepare a cathode active material for secondary batteries.

Example 2

$LiMn_2O_4$ having an average particle diameter of 15 μm and a 50:50 mixture of $LiNi_{1/3}Mn_{1/3}Co_{1/3}O_2$ having an average particle diameter of 7.5 μm and $LiNi_{0.4}Mn_{0.3}Co_{0.3}O_2$ having an average particle diameter of 3 μm were mixed in a weight ratio of 50:50 to prepare a cathode active material for secondary batteries.

Comparative Example 1

$LiMn_2O_4$ having an average particle diameter of 15 μm and $LiNi_{0.5}Mn_{0.3}Co_{0.2}O_2$ having an average particle diameter of 8 μm were mixed in a weight ratio of 50:50 to prepare a cathode active material for secondary batteries.

Comparative Example 2

$LiMn_2O_4$ having an average particle diameter of 15 μm and $LiNi_{1/3}Mn_{1/3}Co_{1/3}O_2$ having an average particle diameter of 7.5 μm were mixed in a weight ratio of 50:50 to prepare a cathode active material for secondary batteries.

Comparative Example 3

$LiNi_{1/3}Mn_{1/3}Co_{1/3}O_2$ having an average particle diameter of 7.5 μm and $LiNi_{0.5}Mn_{0.3}Co_{0.2}O_2$ having an average particle diameter of 8 μm were mixed in a weight ratio of 70:30 to prepare a cathode active material for secondary batteries.

Comparative Example 4

$LiMn_2O_4$ having an average particle diameter of 15 μm and $LiNi_{1/3}Mn_{1/3}Co_{1/3}O_2$ having an average particle diameter of 7.5 μm were mixed in a weight ratio of 10:90 to prepare a cathode active material for secondary batteries.

Experimental Example 1

Life characteristics of lithium secondary batteries were measured when cathode active materials prepared in Examples 1 and 2 and Comparative Examples 1 to 4 were used for the secondary batteries.

First, each of the cathode active materials according to Examples 1 and 2 and Comparative Examples 1 to 4 was mixed with both 5 percent by weight of carbon black and 5 percent by weight of PVdF as a binder, followed by agitation in NMP as a solvent. The mixture was then applied to an aluminum foil as a metal current collector. The coated aluminum foil was dried in a vacuum oven at 120° C. for 2 hours or more, thus forming a cathode. Then, an electrode assembly was fabricated using the formed cathode, an anode formed by applying MCMB artificial graphite to a copper foil, and a porous separator formed of polypropylene. After the electrode assembly was placed in a pouch and lead lines were connected to the electrode assembly, an electrolyte including 1M $LiPF_6$ salt dissolved in a solution of ethylene carbonate (EC) and dimethyl carbonate (DMC) in a volume ratio of 1:1 was introduced into the pouch. The pouch was then sealed to fabricate a lithium secondary battery.

Life characteristics of the fabricated lithium secondary battery were measured while the lithium secondary battery was repeatedly charged and discharged in a voltage range of 3 to 4.2V. Table 1 shows life measurement results of the lithium secondary battery.

TABLE 1

| | Life Characteristics (Capacity (in %) at 300th cycle relative to initial capacity) |
|---|---|
| Ex. 1 | 94% |
| Ex. 1 | 95% |
| Comp. Ex. 1 | 90% |
| Comp. Ex. 2 | 89% |
| Comp. Ex. 3 | 85% |
| Comp. Ex. 4 | 87% |

From the measurement results of Examples 1 and 2 and Comparative Examples 1 and 2 shown in Table 1, it can be seen that life characteristics of the secondary batteries fabricated using a cathode active material including a mixture of lithium manganese oxide and lithium nickel-manganese-cobalt composite oxides having different elemental compositions or having the same elemental composition and different average particle diameters were improved.

The lithium secondary battery fabricated in the above manner was discharged for 10 seconds under a state of charge (SOC) of 50% at room temperature and discharge power thereof was then measured. Measurement results are shown in Table 2.

TABLE 2

| | Discharge Power (SOC 50%, 25° C.) |
|---|---|
| Ex. 1 | 80.8 |
| Ex. 1 | 80.9 |
| Comp. Ex. 1 | 71.6 |
| Comp. Ex. 2 | 72.3 |
| Comp. Ex. 3 | 69 |
| Comp. Ex. 4 | 73.2 |

As can be seen from Table 2, it was found that the lithium secondary battery according to the present invention also exhibited very high discharge characteristics.

Example 3

$LiMn_2O_4$ having an average particle diameter of 14 μm and a 50:50 mixture of two types of $LiNi_{1/3}Mn_{1/3}Co_{1/3}O_2$ having respective average particle diameters of 7.4 μm and 4.9 μm were mixed in a weight ratio of 50:50 to prepare a cathode active material for secondary batteries.

Comparative Example 5

LiMn$_2$O$_4$ having an average particle diameter of 14 μm and LiNi$_{1/3}$Mn$_{1/3}$Co$_{1/3}$O$_2$ having an average particle diameter of 7.4 μm were mixed in a weight ratio of 50:50 to prepare a cathode active material for secondary batteries.

Experimental Example 2

Lithium secondary batteries were fabricated according to a method of Experimental Example 2 using cathode active materials prepared in Example 3 and Comparative Example 5. Discharge power and capacity of the fabricated lithium secondary batteries were measured as SOC changes at 25° C. Measurement results are shown in Table 3.

TABLE 3

| | Capacity (Ah) | Discharge Power (25° C., 10 sec, W) | | |
|---|---|---|---|---|
| | | SOC 95% | SOC 50% | SOC 30% |
| Ex. 3 | 15.9 | 1485 | 1219 | 977 |
| Comp. Ex. 5 | 15.5 | 1342 | 1106 | 886 |

As can be seen from Table 3, the lithium secondary battery using the cathode active material based on Example 3 exhibited superior power characteristics to the lithium secondary battery based on Comparative Example 5.

In addition, low-temperature starting performance (cold cranking power) of the above secondary batteries was measured at −30° C. Measurement results are shown in FIG. 1.

As can be seen from FIG. 1, the lithium secondary battery based on Example 3 exhibited superior low-temperature characteristics to the lithium secondary battery based on Comparative Example 5.

Example 4

LiMn$_2$O$_4$ having an average particle diameter of 14 μm and a 50:50 mixture of two types of LiNi$_{1/3}$Mn$_{1/3}$Co$_{1/3}$O$_2$ having respective average particle diameters of 7.4 μm and 3.9 μm were mixed in a weight ratio of 50:50 to prepare a cathode active material for secondary batteries.

Experimental Example 3

Figure 2:
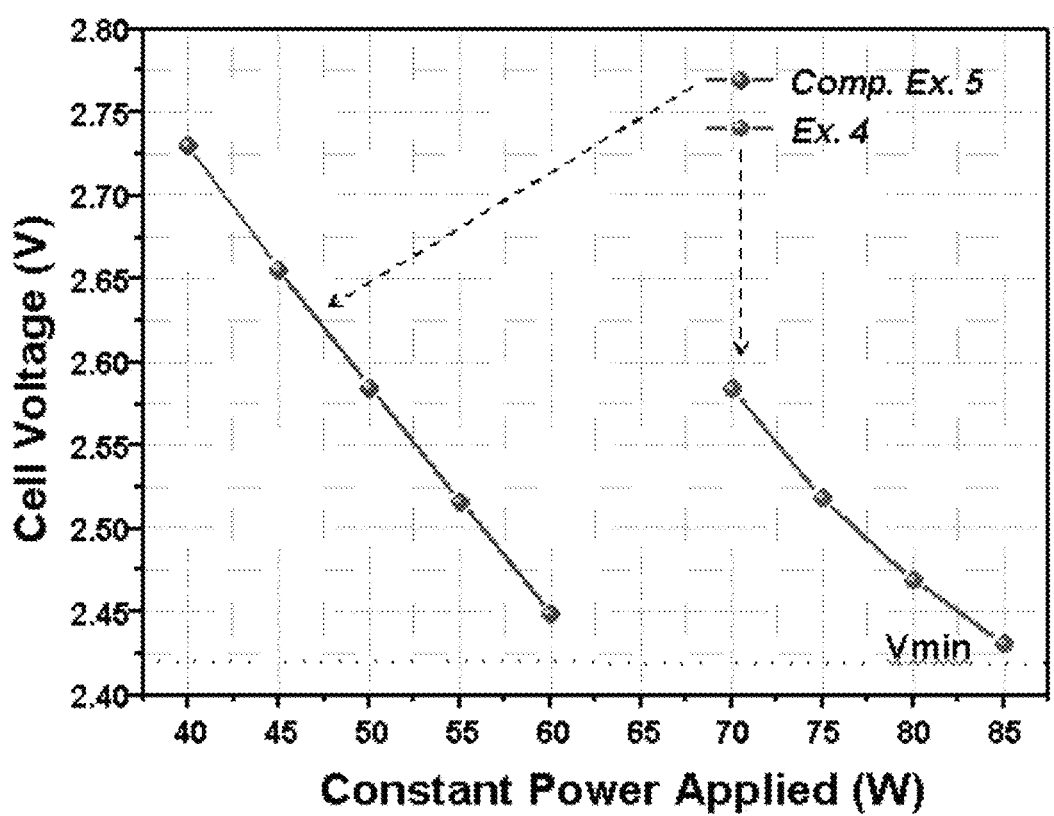
FIGS. 2 and 3 are graphs showing measurement results of cold cranking power and measurement results of low temperature continuous discharge characteristics in Experimental Example 3.

Lithium secondary batteries were fabricated according to a method of Experimental Example 2 using cathode active materials prepared in Example 4 and Comparative Example 5. Low-temperature starting performance (cold cranking power) of the fabricated lithium secondary batteries was measured at −30° C. Measurement results are shown in FIG. 2. In addition, continuous discharge characteristics (with discharge power of 105 W) of the lithium secondary batteries were evaluated at −10° C. under an SOC of 20%. Measurement results are shown in FIG. 3.

Figure 3:
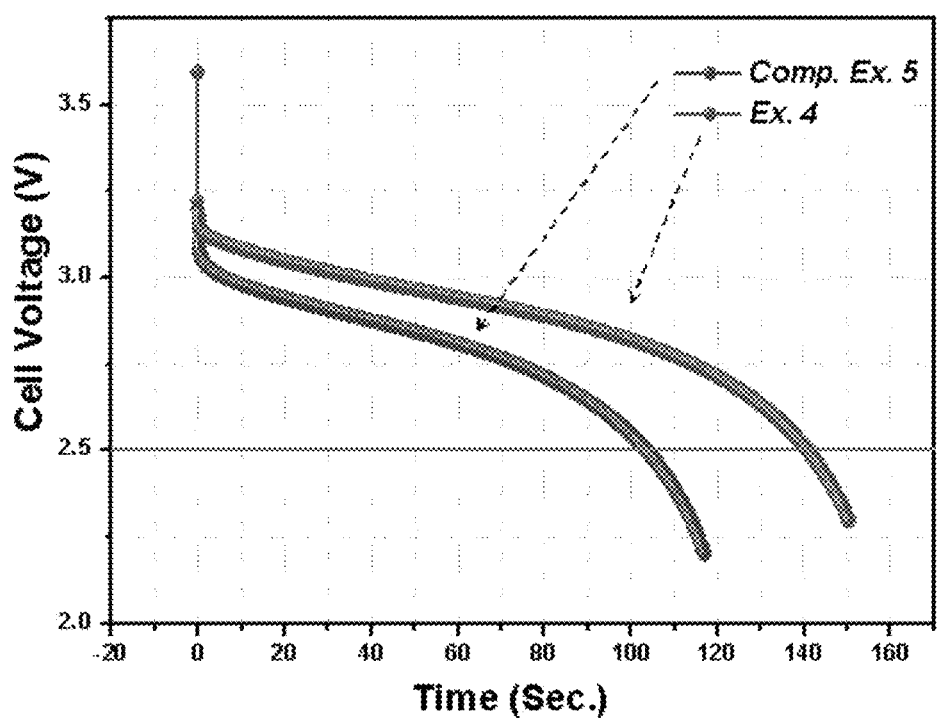

As can be seen from FIGS. 2 and 3, the lithium secondary battery based on Example 4 exhibited overall low-temperature characteristics significantly superior to the lithium secondary battery based on Comparative Example 5.

It will be apparent to those skilled in the art that various modifications and variations are possible in light of the above teaching without departing from the scope of the invention.

INDUSTRIAL APPLICABILITY

As is apparent from the above description, a cathode active material according to the present invention includes a specific lithium manganese oxide (A) having a spinel crystal structure and two types of lithium nickel-manganese-cobalt composite oxides (B), which are different from each other in elemental composition, particle diameter or the like. Accordingly, it is possible to secure stability of lithium secondary batteries while exhibiting significantly superior battery life, power, and low temperature characteristics.

The invention claimed is:

1. A cathode active material for secondary batteries, the cathode active material being a mixture comprising at least one type of lithium manganese oxide (A) having a spinel crystal structure and at least two types of lithium nickel-manganese-cobalt composite oxides (B) containing Ni, Mn, and Co as transition metals,
   wherein the lithium nickel-manganese-cobalt composite oxides (B) are different from each other in terms of at least one selected from the group consisting of particle diameter, and density,
   wherein the lithium manganese oxide has a spinel crystal structure and has an elemental composition represented by Formula (1) and the lithium nickel-manganese-cobalt composite oxides are selected from compounds having an elemental composition represented by Formula (2):

$$Li_{1+x}Mn_{2-y}M_yO_4 \qquad (1)$$

$$Li_{1+z}Ni_aMn_bCo_{1-(a+b)}O_2 \qquad (2)$$

where 0≤x≤0.2 and 0≤y≤1,
   where M is at least one element selected from the group consisting of Al, Mg, Ni, Co, Fe, Cr, V, Ti, Cu, B, Ca, Zn, Zr, Nb, Mo, Sr, Sb, W and Bi, and
   where 0≤z≤0.1, 0.2≤a≤0.7, 0.2≤b≤0.7 and a+b<1,
   wherein the lithium nickel-manganese-cobalt composite oxides (B) comprise two types of oxides having the same elemental composition and different particle diameters,
   wherein the lithium nickel-manganese-cobalt composite oxides (B) comprising a first oxide (B1) and a second oxide (B2) have an average particle diameter in a range from 3 to 10 μm and an average particle diameter of the first oxide (B1) is 10 to 70% of an average particle diameter of the second oxide (B2), and
   wherein the mixture ratio of the first oxide (B1) and the second oxide (B2) is 50:50 by weight.

2. The cathode active material according to claim 1, wherein the mixture ratio of the lithium manganese oxide (A) to the lithium nickel-manganese-cobalt composite oxides (B) ranges from 30:70 to 90:10 by weight.

3. The cathode active material according to claim 1, wherein the lithium nickel-manganese-cobalt composite oxides (B) have an elemental composition of Li$_{1+z}$Ni$_{1/3}$Mn$_{1/3}$Co$_{1/3}$O$_2$ (where 0≤z≤0.1) or Li$_{1+z1}$Ni$_a$Mn$_b$Co$_{1-(a+b)}$O$_2$ (where 0≤z≤0.1, 0.4≤a≤0.7, 0.2≤b≤0.4 and a+b<1).

4. The cathode active material according to claim 1, wherein the active material has an energy density of 150 to 220 Wh/kg.

5. A cathode mix comprising the cathode active material according to claim 1.

6. A cathode for secondary batteries, wherein the cathode mix according to claim 5 is applied to a current collector.

7. A lithium secondary battery comprising the cathode according to claim 6.

8. The lithium secondary battery according to claim 7, wherein the lithium secondary battery is used as a unit cell of a battery module that is a power source of a middle or large-scale device.

9. The lithium secondary battery according to claim 8, wherein the middle or large-scale device is an electric vehicle, a hybrid electric vehicle, a plug-in hybrid electric vehicle or a power storage system.

* * * * *